United States Patent [19]
Suzuki et al.

[11] Patent Number: 5,502,594
[45] Date of Patent: Mar. 26, 1996

[54] ZOOM LENS INCORPORATING VIBRATION-PROOFING FUNCTION

[75] Inventors: Kenzaburo Suzuki, Tokyo; Masahiro Nakatsuji, Machida, both of Japan

[73] Assignee: Nikon Corporation, Tokyo, Japan

[21] Appl. No.: 132,909

[22] Filed: Oct. 7, 1993

[30] Foreign Application Priority Data

Oct. 14, 1992 [JP] Japan .................................. 4-275621
Oct. 14, 1992 [JP] Japan .................................. 4-275626

[51] Int. Cl.$^6$ .................................................. G02B 27/64
[52] U.S. Cl. ........................ 359/557; 359/764; 359/677
[58] Field of Search ..................................... 359/763, 764, 359/557, 677, 676

[56] References Cited

U.S. PATENT DOCUMENTS

| | | | |
|---|---|---|---|
| 4,576,446 | 3/1986 | Kamata | 359/823 |
| 5,000,549 | 3/1991 | Yamazaki | 350/423 |
| 5,040,881 | 8/1991 | Tsuji | 359/557 |
| 5,325,233 | 6/1994 | Nakatsuji et al. | 359/684 |

FOREIGN PATENT DOCUMENTS

| | | |
|---|---|---|
| 1-189621 | 7/1989 | Japan . |
| 1-191112 | 8/1989 | Japan . |
| 1-191113 | 8/1989 | Japan . |
| 1-284823 | 11/1989 | Japan . |

OTHER PUBLICATIONS

*Patent Abstracts of Japan*, vol. 13, No. 480 (P–952), Oct. 31, 1989 (JP–A–01 191 112).
*Patent Abstracts of Japan*, vol. 13, No. 480 (P–952), Oct. 31, 1989 (JP–A–01 191 113).
*Patent Abstracts of Japan*, vol. 13, No. 478 (P–951), Oct. 30, 1989 (JP–A–01 189 621).
*Patent Abstracts of Japan*, vol. 10, No. 22 (P–424), Jan. 28, 1986 (JP–A–60 175 200).

*Primary Examiner*—Georgia Y. Epps
*Assistant Examiner*—Thomas Robbins
*Attorney, Agent, or Firm*—Shapiro and Shapiro

[57] ABSTRACT

A zoom lens incorporating a vibration-proofing function comprises, sequentially from an object side, a first lens group $G_1$ having a positive refracting power; a second lens group $G_2$ having a negative refracting power; a third lens group $G_3$ having a negative refracting power; a fourth lens group $G_4$ having a positive refracting power; and a fifth lens group $G_5$ having a negative refracting power. The lens groups move so that when varying a magnifying power from a wide-angle end to a telephoto end, a spacing between the first and second lens groups $G_1$, $G_2$ increases; a spacing between the second and third lens groups $G_2$, $G_3$ changes linearly or non-linearly; and a spacing between the fourth and fifth lens groups $G_4$, $G_5$ is reduced. The zoom lens comprises a shift means for moving one of the third and fourth lens groups $G_3$, $G_4$ perpendicularly across the optical axis.

20 Claims, 4 Drawing Sheets

ZOOM LENS INCORPORATING VIBRATION-PROOFING FUNCTION

BACKGROUND OF THE INVENTION

1. Field of the Invention

The present invention relates generally to a lens for a photo in 35 mm format and, more particularly, to a vibration-proofing function of a telephoto zoom lens.

2. Related Background Art

There have hitherto been made a large number of proposals of optical systems incorporating a vibration-proofing function for compensating a camera shake. As disclosed in, e.g., Japanese Patent Application Laid-open Nos. 1-189621, 1-191112 and 1-191113, zoom lenses each constructed of two or more lens groups are intended to compensate the camera shake by moving an arbitrary lens group in a direction orthogonal to the optical axis for preventing image vibrations. Alternatively, as disclosed in Japanese Patent Application Laid-open No. 1-284823, the zoom lens is intended to compensate the camera shake by moving some lens elements of a fixed first lens group in a direction perpendicular to the optical axis when performing a zooming motion.

The prior art described above does not, however, obtain a back-focal distance sufficient for a single-lens reflex camera and present defects in which a large zoom ratio can not be actualized and so on. Such prior art is unsuitable for the lenses of the single-lens reflex camera for a photo in 35 mm format, particularly for a small-sized telephoto zoom lens exhibiting a high performance.

SUMMARY OF THE INVENTION

Accordingly, it is a primary object of the present invention to provide a small-sized telephoto zoom lens incorporating a vibration-proofing function and exhibiting a high performance.

To obviate the problems given above, according to one aspect of the present invention, there is provided a zoom lens comprising, sequentially from an object side, a first lens group $G_1$ having a positive refracting power, a second lens group $G_2$ having a negative refracting power, a third lens group $G_3$ having a negative refracting power, a fourth lens group $G_4$ having a positive refracting power and a fifth lens group $G_5$ having a negative refracting power. The lens groups move in the manner which follows. When varying a magnifying power from a wide-angle end to a telephoto end, a spacing between the first and second lens groups $G_1$, $G_2$ increases. A spacing between the second and third lens groups $G_2$, $G_3$ changes linearly or non-linearly. A spacing between the fourth and fifth lens groups $G_4$, $G_5$ is reduced. The zoom lens further comprises a shift means for preventing image vibrations by moving the third lens group $G_3$ in a direction substantially orthogonal to the optical axis.

The present invention adopts the zoom lens based fundamentally on a positive/negative/negative/positive/negative 5-group construction and is thereby suited to a telephoto zoom lens for the photo in 35 mm format. The following is a brief explanation of characteristics and advantages of this type of zoom lens.

According to this invention, it is possible to attain the compact telephoto zoom lens constructed well enough to make the most of the characteristics of the multi-group construction, i.e., the positive/negative/negative/positive/negative 5-group construction and capable of exhibiting an excellent image-forming performance and being applied to an increase in magnification. This type of zoom lens can be reduced in its entire length particularly at the wide-angle end. Then, because of being the multi-group construction, it is feasible to obtain an excellent image-forming performance even when a zoom ratio is large on account of a large degree of freedom for correcting aberrations, including a degree of freedom about the way of motions of the lens groups. Especially, as in the present invention, the zoom lens is of such a type that the zoom lens becomes small in terms of its entire length at the wide-angle end but elongates when varying a magnifying power by zooming to the telephoto end. In this type of zoom lens, as compared with a 4-group afocal type of conventional telephoto zoom lens, the entire length at the wide-angle end and weight of the whole zoom lens can be reduced. Further, heights of rays of light traveling through the respective lens groups at the wide-angle end can be also decreased. This results in a less amount of aberrations caused in the respective lens groups, which is in turn advantageous when correcting the aberration particularly on the wide-angle side. Moreover, the number of groups is large, and, therefore, a degree of freedom about the way of selecting a distribution of refracting powers increases. A back-focal distance sufficient for the single-lens reflex camera is easily obtained.

Generally, in the telephoto zoom lens, the first lens group is the largest one and is often extended during focusing. For this reason, the first lens group is 10 constructed as a compensation optical system which is displaced from the optical axis for preventing image vibrations. This construction is undesirable because of increases in sizes of holding and driving mechanisms.

Hence, similarly in the positive/negative/negative/positive/negative type, the arrangement that the first lens group is formed as the vibration-proofing compensation optical system is also undesirable. Further, as in the case of the fifth lens group of this invention, the lens group having a large moving quantity in the optical-axis direction during the variable power is undesirable because of being complicated in terms of structure.

However, the lens group close to an aperture stop is relatively small in its lens diameter for the reason of a dense convergence of a bundle of rays at each field angle. Then, the arrangement that such a lens group is configured as the compensation optical system displaced from the optical axis is desirable for miniaturizing the holding and driving mechanisms. An image position can be corrected without causing a difference in variations in image quality between the central portion and peripheral portions in terms of aberration.

In such a 5-group zoom type, the aperture stop is located in the third or fourth lens group. This arrangement is advantageous for correcting the aberrations.

From the above-mentioned, according to the present invention, image shift means for preventing the vibrations is provided in the third lens group to miniaturize the whole lens system. The aperture stop is located in the fourth lens group so that a structure of the third lens group does not become intricate. Then, for simplifying a vibration-proof driving mechanism, image vibrations are compensated by moving the third lens group in the direction substantially orthogonal (transverse) to the optical axis.

Further, when the lens group shifts across the optical axis to prevent image vibrations, a flare stop fixed on the optical axis is provided separately from the aperture stop. Unnecessary rays are thereby shielded, and this is more effective.

Furthermore, it is desirable to satisfy the following conditional formulae on the basis of the construction described above.

$$0.3 < f_1/(F_W \cdot F_T)^{1/2} < 1.5 \quad (1)$$

$$0.3 < f_2/f_3 < 5 \quad (2)$$

$$0.8 < |f_3|/f_W < 2 \quad (3)$$

The conditional formulae (1) to (3) will hereinafter be explained.

In the conditional formula (1), proper ranges are determined with respect to the focal length $f_W$ of the zoom lens at the wide-angle end, the focal length $f_T$ at the telephoto end and the focal length $f_1$ of the first lens group $G_1$. If over an upper limit of the conditional formula (1), the entire length increases at the telephoto end. This is, as a matter of course, contradictory to making it compact and undesirably brings about both a deficiency in quantity of marginal rays at the telephoto end and an enlarged diameter of the front lens element. Note that the effects of the present invention can be exhibited by setting the upper limit down to 1.0 or under. Whereas if under a lower limit of the conditional formula (1), the focal length $f_1$ of the first lens group $G_1$ becomes to small, resulting in a tendency to insufficiently correct a spherical aberration at the telephoto end. Fluctuations in curvature of field during the variable power by zooming become very large. Besides, there is excessively increased an image-forming magnification at the telephoto end through a lens system after the second lends group $G_2$. An on-axis chromatic aberration produced in the first lens group $G_1$ is expanded, with the result that a good image-performance can not be obtained. Note that setting the lower limit to 0.6 or more is desirable for obtaining a much better image-forming performance.

In the conditional formula (2), a proper rate of refracting powers is determined from the focal length $f_2$ of the second lens group $G_2$ and the focal length $f_3$ of the third lens group $G_3$.

If in excess of an upper limit of the conditional formula (2), the focal length $f_3$ of the third lens group $G_3$ becomes too small. A coma caused during the variable power by zooming fluctuates largely. A distortion at the telephoto end shifts largely toward the negative side. A negative downward coma at the wide-angle end is also produced. A correction of the spherical aberration at the telephoto end tends to be excessive on the positive side. No good image-forming performance can be obtained. Note that a more preferable image-forming performance is acquired by setting the upper limit to 3 or less.

Whereas if under a lower limit of the conditional formula (2), the focal length $f_2$ os the second lens group $G_2$ becomes too small. The coma caused when varying the magnifying power by zooming largely fluctuates. The distortion at the telephoto end shifts largely toward the positive side. In addition, a positive downward coma is produced at the wide-angle end. The spherical aberration at the telephoto end tends to be excessive. Hence, the good image-forming performance can not be obtained.

Determined in the conditional formula (3) is a proper ratio of a magnitude of the focal length $f_3$ of the third lends group $G_3$ to the focal length $f_W$ of the whole system at the wide-angle end.

If over an upper limit of the conditional formula (3), the focal length $f_3$ of the third lens group G becomes too large. For instance, if it is presumed for convenience to explain the conditional formula that the lens system after the fourth lens group $G_4$ is in a fixed state, a sufficient back-focal length at the wide-angle end is hard to secure. Besides, the fluctuations both in the coma and in the curvature of field during the variable power by zooming undesirably become too large. Further, the third lens group $G_3$ acts to prevent the vibrations, and hence a quantity of shift across the optical axis increases. This undesirably leads to an increase in size and an intricacy of the structure. Whereas if under a lower limit of the conditional formula (3), the focal length of the third lens group $G_3$ becomes too small. For example, if it is assumed for convenience that the lens system after the fourth lens group $G_4$ is in the fixed state, the entire length at the wide-angle end increases. A lens diameter of the fifth lens group $G_5$ undesirably augments. Further, the third lens group is a group for preventing image vibrations, and, therefore, the quantity of shift across the optical axis is reduced. It is therefore undesirably difficult to control a shift position thereof.

Moreover, it is desirable to meet the following condition:

$$0.25 < D_{W3-4}/f_W < 0.65 \quad (4)$$

where $D_{W3-4}$ is the spacing between the third and fourth lens groups $G_3$, $G_4$ at the wide-angle end.

For instance, when it is presumed for convenience that the fifth lens group $G_5$ is in the fixed state, and if over a upper limit of the conditional formula (4), the spherical aberration and the coma remarkably augment. The aberrations are hard to correct. Besides, undesirably a lens diameter of the fifth lens group $G_5$ is enlarged, and the entire length also increase. Whereas if under a lower limit thereof, it is difficult to secure a space required for the variable power by zooming. This is not suited to a higher magnification. Further, an outside-oriented coma is produced at the wide-angle end, and undesirably the back-focal length is hard to secure.

Then, it is desirable to further satisfy the following condition:

$$-20 < \beta_{T3}/\beta_{W3} < 10 \quad (5)$$

where $\beta_{W3}$ is the using magnification of the third lens group $G_3$ at the wide-angle end, and $\beta_{T3}$ is the using magnification thereof at the telephoto end.

When exceeding a range of the conditional formula (5), the fluctuations in various aberrations, especially the fluctuations in the curvature of field undesirably become excessive.

For obtaining much better performance, it is desirable to satisfy the following conditions:

$$\bar{n} > 1.6 \quad (6)$$

$$\bar{v} > 40 \quad (7)$$

where $\bar{n}$ is the mean refractive index of the lenses constituting the third lens group $G_3$, and $\bar{v}$ is the mean Abbe number with respect to the mean d-line of the lenses constituting the third lens group $G_3$, and the mean refractive index $\bar{n}$ of the third lens group $G_3$ is obtained by the following formula:

$$\bar{n} = (\psi_1 n_1 + \psi_2 n_2 + \ldots + \psi_L \cdot n_L)/(\psi_1 + \psi_2 + \ldots + \psi_L)$$

where $n_1, \ldots n_L$ are refractive indices of the lens elements constituting the third lens group, and $\psi_1, \ldots \psi_L$ are refracting powers (=inverse number of focal length).

Further, it is desirable to meet the following condition:

$$R_{31} > -200 \quad (8)$$

where $R_{31}$ is the radius of curvature of the closest-to-theobject surface of the third lens group $G_3$.

To eliminate the problems inherent in the prior art, according to another aspect of the present invention, there is provided a zoom lens comprising, sequentially from an object side, a first lens group $G_1$ having a positive refracting power, a second lens group $G_2$ having a negative refracting power, a third lens group $G_3$ having a negative refracting power, a fourth lens group $G_4$ having a positive refracting power and a fifth lens group $G_5$ having a negative refracting power. The lens groups move in the manner which follows. When varying a magnifying power from a wide-angle end to a telephoto end, a spacing between the first and second lens groups $G_1$, $G_2$ increases. A spacing between the second and third lens groups $G_2$, $G_3$ changes linearly or non-linearly. A spacing between the fourth and fifth lens groups $G_4$, $G_5$ is reduced. The zoom lens further comprises a shift means for preventing image vibrations by moving the fourth lens group G4 in a direction substantially orthogonal (transverse) to the optical axis.

In the case of obtaining a relatively large zoom ratio in the 5-group system zoom type described above, it is desirable to locate the aperture stop in the fourth lens group in terms of correcting the aberrations.

It is therefore preferable to construct the fourth lens group by way of a correction lens group in the zoom type as shown in the present invention. Further, for simplifying the vibration-proof driving mechanism, it is desirable to compensate image vibrations by moving the fourth lens group in the direction substantially orthogonal to the optical axis. At this time, it is desirable that the aperture stop be fixed on the optical axis to shield the unnecessary rays.

Further, when lens group shifts across the optical axis to prevent the image vibrations, providing the flare stop fixed on the optical axis separately from the aperture stop is more effective in shielding the unnecessary rays.

Note that for avoiding the structural intricacy, if the zoom ratio is not so large, the aperture stop may be located in the third lens group to simplify the structure of the fourth lens group.

Additionally, in the construction mentioned above, it is desirable to satisfy the following conditions:

$$0.3 < f_1/(F_W f_T)^{1/2} < 1.5 \qquad (1)$$

$$0.25 < D_{W3-4}/F_W < 0.8 \qquad (9)$$

$$0.6 < f_4/|f_5| < 1.2 \qquad (10)$$

The conditional formulae (9) and (10) will hereinafter be described.

The conditional formula (9) is intended to determine the spacing $D_{W3-4}$ between the third and fourth lens groups $G_3$, $G_4$ at the wide-angle end.

For explaining the conditional formulae, it is assumed for convenience that the fifth lens group $G_5$ is in the fixed state. In this case, if over an upper limit of the conditional formula (9), the spherical aberration and the coma become remarkably large enough to make the correction of aberration difficult. Moreover, the fifth lens Group $G_5$ is undesirably large in its lens diameter, and the entire length is also large. Whereas if under a lower limit thereof, a space required for the variable power is hard to secure. This is unsuitable for the higher magnification. Additionally, the outside-oriented coma is produced at the wide-angle end, and it is undesirably difficult to secure the back-focal length.

The conditional formula (10) is intended to determine a distribution of the refracting powers of the fourth and fifth lens groups $G_4$, $G_5$.

If in excess of an upper limit of the conditional formula (10), the focal length of the fifth lens group $G_5$ becomes too small, and an astigmatic difference at the wide-angle end increases. Then, the distortion shifts largely in the positive direction at the telephoto end as well as at the wide-angle end. Petzval's sum deviates toward the negative side, and a good aberration balance can not be kept during the variable power by zooming. Further, the fourth lens group $G_4$ acts to prevent image vibrations, and hence there is a rise in the quantity of shift across the optical axis. For this reason, undesirably the structure increases in size and easily becomes complicated. Whereas if under a lower limit of the conditional formula (10), the focal length of the fourth lens group $G_4$ becomes too small. The spherical aberration increases so much toward the negative side over the entire area during the variable power by zooming. The coma also increases. Furthermore, if it is presumed for convenience that the fifth lens group $G_5$ is in the fixed state, it is difficult to secure the sufficient back-focal length. Then, there is reduced the quantity with which the fourth lens group $G_4$ shifts perpendicularly across the optical axis to prevent image vibrations. It is therefore undesirably difficult to control the shift position thereof.

By the way, for securing the good image-forming performance and vibration-proofing performance as well, the fourth lens group $G_4$ is constructed of, sequentially from the object side, a front group having a positive or negative refracting power and a rear group having a positive refracting power. The following are explanations in a case (1) where the front group has the positive refracting power and a case (2) where the front group has the negative refracting power.

(1) When the fourth lens group $G_4$ is composed of the front group exhibiting the positive refracting power and the rear group exhibiting the positive refracting power, the refracting power of the fourth lens group as a whole is shared with the rear group. Especially an occurrence of the spherical aberration among the various aberrations can be desirably reduced.

(2) When the fourth lens group $G_4$ is composed of the front group exhibiting the negative refracting power and the rear group exhibiting the positive refracting power, the principal point of the whole of the fourth lens group shifts toward an image side. An interval of its principal point from that of the fifth lens group is widened enough to obtain a space for zooming. This is preferable for the higher magnification in the zoom ratio. Further, structurally the fifth lens group can be made thick in wall.

Note that preferably the rear group is constructed of, sequentially from the object side, a positive single lens and a negative single lens. Further, it is more desirable to meet the following condition:

$$0.5 < f_{4R}/f_4 < 2.5 \qquad (11)$$

where $f_4$: focal length of the fourth lens group $G_4$, and $f_{4R}$: focal length of the rear group.

The conditional formula (11) serves to determine a distribution of the refracting powers of the rear group in the fourth lens group $G_4$.

If under a lower limit thereof, the principal point of the fourth lens group shifts largely toward the image side. The spacing between the third and fourth lens groups is narrowed down to such an extent that the space necessary for the variable power is hard to secure. This is unsuited to the higher magnification in the zoom ratio. Besides, particularly the spherical aberration among a variety of aberrations caused in the rear group is produced largely, with the result that the good image-forming performance can not be acquired. Whereas if over an upper limit thereof, the on-axis chromatic aberration produced in the rear group becomes large. The good image-forming performance can not be therefore obtained. In addition, the positive refracting power of the front group relatively augments, and, therefore, undesirably Petzval's sum tends to shift largely toward the positive side.

Further, for reducing the various aberrations caused in the rear group, it is desirable to satisfy the following condition:

$$(N_+ + N_-)/2 > 1.7 \tag{12}$$

where $N_+$ is the refractive index of the positive single lens constituting the rear group, and $N_-$ is the refractive index of the negative single lens.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

A lens in accordance with first and second embodiment is constructed of, sequentially from an object side, a first lens group $G_1$ having a positive refracting power, a second lens group $G_2$ having a negative refracting power, a third lens group $G_3$ having a negative refracting power, a fourth lens group $G_4$ having a positive refracting power and a fifth lens group $G_5$ having a negative refracting power.

Then, when varying a magnifying power from a wide-angle end to a telephoto end, the lens groups move so that a spacing between the first and second lens groups $G_1$, $G_2$ increases; a spacing between the second and third lens groups $G_2$, $G_3$ changes linearly or non-linearly; and a spacing between the fourth and fifth lens groups $G_4$, $G_5$ is reduced. Provided is a shift means for preventing image vibrations by moving the third lens group $G_3$ in a direction substantially orthogonal (transverse) to the optical axis.

The following are explanations of the first end second embodiments of this invention.

[Embodiment 1]

Figure 1:
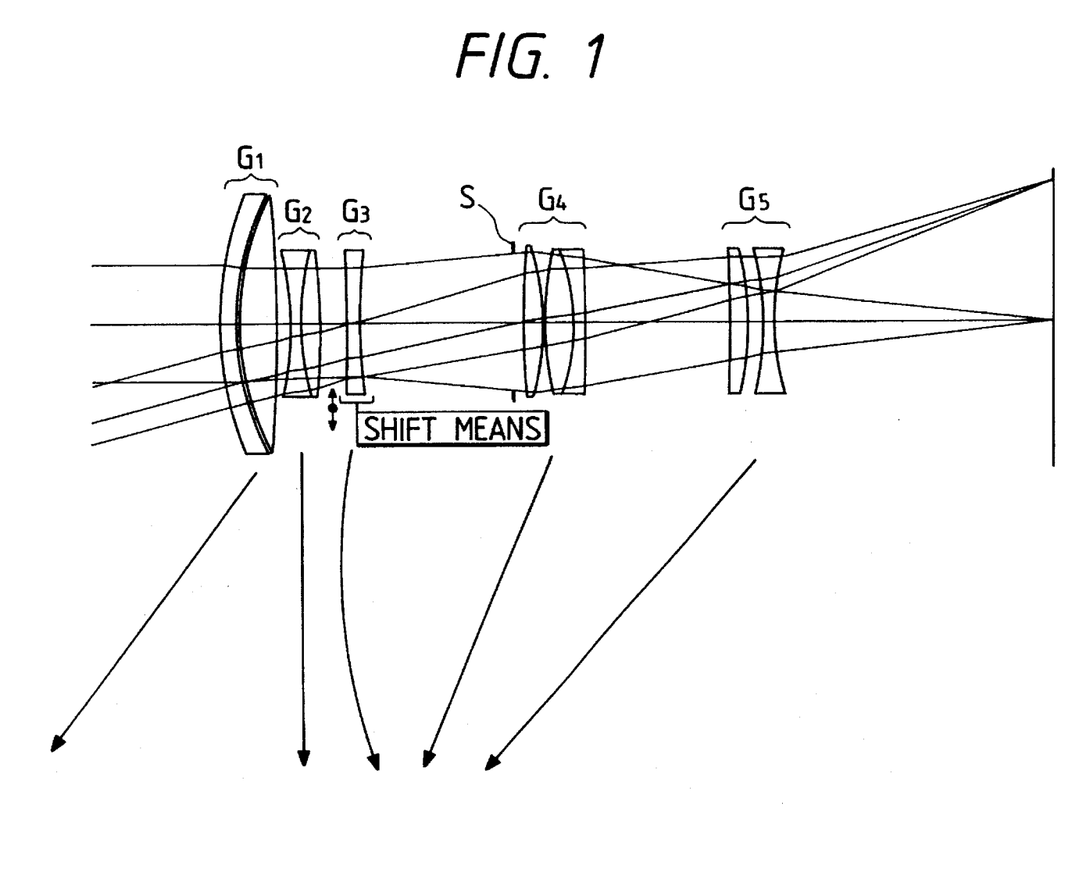
FIG. 1 is a block diagram illustrating a layout of lenses in an embodiment 1 of this invention.

FIG. 1 illustrates a layout of lenses in an embodiment 1. The zoom lens is constructed of, sequentially from the object side, a first lens group $G_1$ consisting of a negative meniscus lens and a biconvex positive lens, a second lens group $G_2$ consisting of a cemented lens of a biconcave negative lens and a biconvex positive lens, a third lens group $G_3$ consisting of a biconcave negative lens, a fourth lens group $G_4$ consisting of a cemented lens of a biconvex lens and a negative meniscus lens and a fifth lens group $G_5$ consisting of a biconvex lens and a biconcave lens.

The following Table 1 shows values of items in the embodiment 1 according to this invention. In Table of the items in accordance with the embodiment, f is the focal length, $F_{No}$ is the F-number and $2\omega$ is the field angle. Then, the numerals at the left end represent the order from the object side, r is the radius of curvature of the lens surface, and d is the lens surface separation. The refractive index n and the Abbe number $\nu$ are values with respect to d-line ($\lambda = 587.6$ nm).

[TABLE 1]

Values of the items in the embodiment 1:

f = 82–196
$F_{NO}$ = 4.6–5.7
$2\omega$ = 29.66–12.16°

|   | r | d | ν | n |
|---|---|---|---|---|
| 1 | 53.631 | 2.20 | 23.0 | 1.86074 |
| 2 | 39.941 | .50 | | |
| 3 | 42.000 | 6.00 | 69.9 | 1.51860 |
| 4 | −253.597 | (d4 = variable) | | |
| 5 | −46.982 | 1.50 | 47.1 | 1.67003 |
| 6 | 37.449 | 3.00 | 27.6 | 1.75520 |
| 7 | −154.003 | (d7 = variable) | | |
| 8 | −250.166 | 2.00 | 47.5 | 1.78797 |
| 9 | 78.415 | (d9 = variable) | | |
| 10 | 152.812 | 3.00 | 46.4 | 1.58267 |
| 11 | −37.057 | .20 | | |
| 12 | 50.036 | 4.50 | 60.7 | 1.56384 |
| 13 | −31.136 | 1.70 | 25.5 | 1.80458 |
| 14 | −354.680 | (d14 = variable) | | |
| 15 | −488.183 | 3.00 | 26.1 | 1.78470 |
| 16 | −46.681 | 2.07 | | |
| 17 | −50.713 | 1.50 | 53.7 | 1.69350 |
| 18 | 35.916 | (d18 = variable) | | |

(Variable separation in variable power)

| f | 82.0000 | 135.0000 | 196.0000 |
|---|---|---|---|
| D0 | ∞ | ∞ | ∞ |
| d4 | 2.1562 | 23.7506 | 39.4991 |
| d7 | 4.1898 | 2.7190 | 8.8577 |
| d9 | 24.9438 | 14.6750 | 2.8315 |
| d14 | 22.0952 | 12.2404 | 2.1968 |
| d18 | 43.0664 | 64.6608 | 80.4093 |

(Condition corresponding values)

$f_1 = 111.021$, $f_W = 82$, $f_T = 196$
$f_2 = -145.113$
$f_3 = -75.564$
$D_{W3-4} = 24.9438$
$\beta_{W3} = -0.2444$, $\beta_{T3} = -1.8630$
$R_{31} = -250.166$
(1) $f_1/(f_W \cdot f_T)^{1/2} = 0.87573$
(2) $f_2/f_3 = 1.92034$
(3) $|f_3|/f_W = 0.9215$
(4) $D_{W3-4}/f_W = 0.304193$
(5) $\beta_{T3}/\beta_{W3} = 7.623$
(6) n = 1.78797
(7) $\nu = 47.5$
(8) $R_{31} = -250.166$ (Vibration-proof data)

|  | Wide-angle End | Telephoto End |
|---|---|---|
| Moving Quantity (mm) of 3rd Lens Group in Direction Perpendicular to Optical Axis | 0.198 | 0.350 |
| Image Moving Quantity (mm) | 0.2 | 0.5 |

[Embodiment 2]

Figure 2:
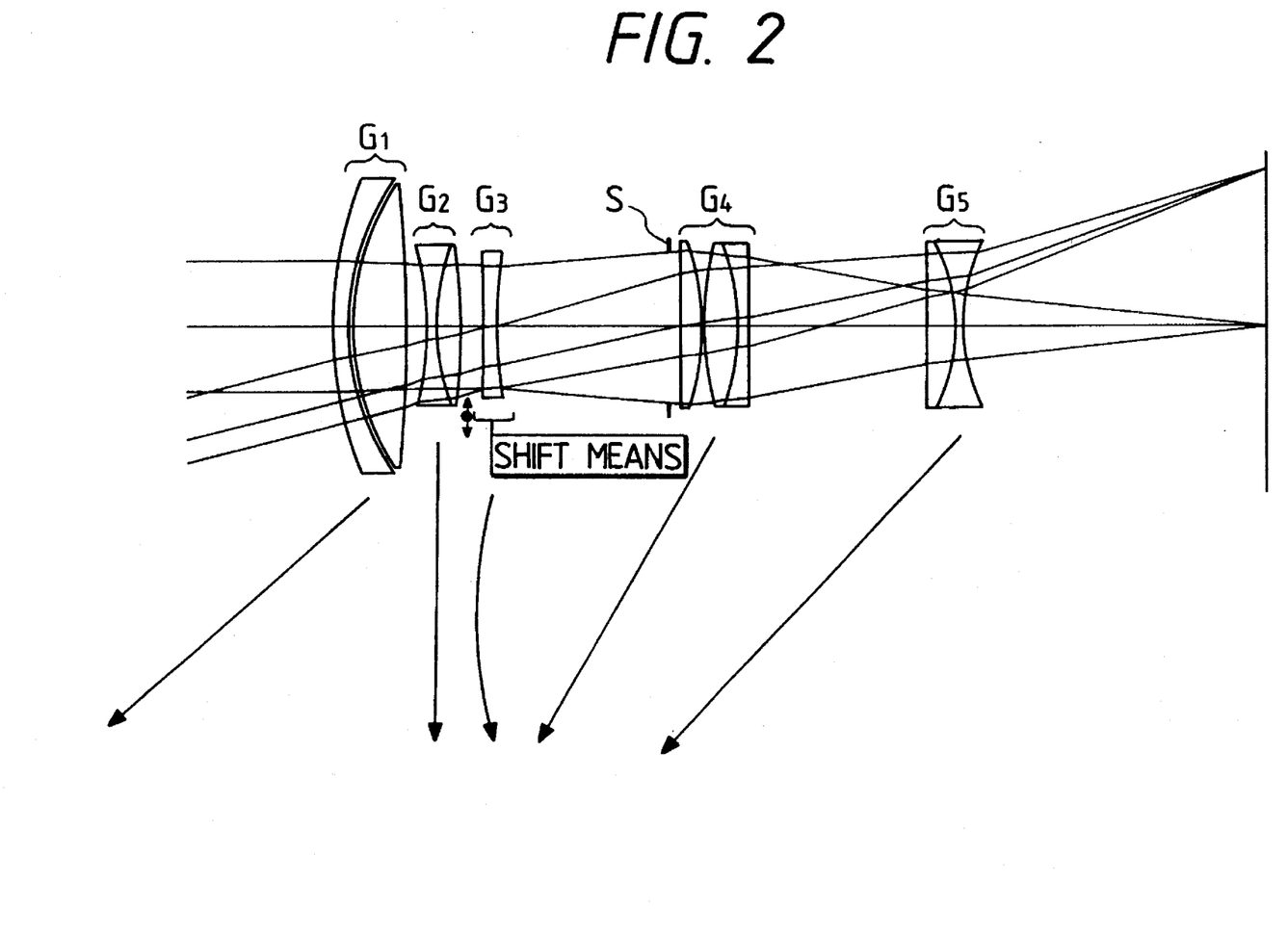
FIG. 2 is a block diagram illustrating a layout of lenses in an embodiment 2 of this invention.

FIG. 2 illustrates a layout of lenses in an embodiment 2. The zoom lens is constructed of, sequentially from the object side, a first lens group $G_1$ consisting of a negative meniscus lens and a biconvex positive lens, a second lens group $G_2$ consisting of a cemented lens of a biconcave negative lens and a biconvex positive lens, a third lens group $G_3$ consisting of a biconcave negative lens, a fourth lens group $G_4$ consisting of a cemented lens of a biconvex lens and a negative meniscus lens and a fifth lens group $G_5$ consisting of a cemented lens of a positive lens having a large convexity toward an image and a biconcave lens.

The embodiment 2 is constructed substantially the same as the embodiment 1. However, the refracting powers and configurations of the respective lens groups are different.

The following Table 2 shows values of items in the embodiment 2 according to this invention. In Table of the items in accordance with the embodiment, f is the focal length, $F_{No}$ is the F-number and $2\omega$ is the field angle. Then, the numerals at the left end represent the order from the object side, r is the radius of curvature of the lens surface, and d is the lens surface separation. The refractive index n and the Abbe number $\nu$ are values with respect to d-line ($\lambda$=587.6 nm).

[TABLE 2]

Values of the items in the embodiment 1:

f = 82–196
$F_{NO}$ = 4.62–5.7
$2\omega$ = 29.24–12.08°

| | r | d | $\nu$ | n |
|---|---|---|---|---|
| 1 | 53.993 | 2.20 | 25.5 | 1.80458 |
| 2 | 37.137 | .50 | | |
| 3 | 37.749 | 7.00 | 64.1 | 1.51680 |
| 4 | –228.729 | (d4 = variable) | | |
| 5 | –42.349 | 1.50 | 42.0 | 1.66755 |
| 6 | 32.372 | 3.00 | 27.6 | 1.75520 |
| 7 | –105.299 | (d7 = variable) | | |
| 8 | –300.511 | 2.00 | 47.5 | 1.78797 |
| 9 | 68.734 | (d9 = variable) | | |
| 10 | 474.746 | 3.00 | 46.4 | 1.58267 |
| 11 | –35.274 | .50 | | |
| 12 | 45.251 | 4.50 | 60.7 | 1.56384 |
| 13 | –32.297 | 1.70 | 25.5 | 1.80458 |
| 14 | –242.346 | (d14 = variable) | | |
| 15 | ∞ | 4.00 | 26.1 | 1.78470 |
| 16 | –24.282 | 1.50 | 38.8 | 1.67163 |
| 17 | 28.801 | (d17 = variable) | | |

(Variable separation in variable power)

| f | 82.0000 | 135.0000 | 196.0000 |
|---|---|---|---|
| D0 | ∞ | ∞ | ∞ |
| d4 | 2.8064 | 24.7099 | 39.9550 |
| d7 | 2.9810 | .5461 | 7.4257 |
| d9 | 24.5298 | 14.9373 | 2.7893 |
| d14 | 23.3891 | 13.5130 | 3.5363 |
| d17 | 40.6047 | 62.50817 | 77.7533 |

(Condition corresponding values)

$f_1$ = 107.913, $f_W$ = 82, $f_T$ = 196
$f_2$ = –179.085
$f_3$ = –70.823
$D_{W3-4}$ = 24.5298
$\beta_{W3}$ = –0.4285, $\beta_{T3}$ = –3.4888
$R_{31}$ = –300.511
(1) $f_1/(f_W \cdot f_T)^{1/2}$ = 0.85121
(2) $f_2/f_3$ = 2.52863
(3) $|f_3|/f_W$ = 0.8637
(4) $D_{W3-4}/f_W$ = 0.299144

[TABLE 2]-continued

Values of the items in the embodiment 1:

(5) $\beta_{T3}/\beta_{W3}$ = 8.1419
(6) n = 1.78797
(7) $\nu$ = 47.5
(8) $R_{31}$ = –300.511

(Vibration-proof data)

| | Wide-angle End | Telephoto End |
|---|---|---|
| Moving Quantity (mm) of 3rd Lens Group in Direction Perpendicular to Optical Axis | 0.188 | 0.341 |
| Image Moving Quantity (Mm) | 0.2 | 0.5 |

Note that if a sufficient variable power range is taken in each embodiment, and when aberrations are sufficiently corrected, the second lens group $G_2$ may be fixed during zooming.

Third and fourth embodiments of this invention will hereinafter be described.

[Embodiment 3]

Figure 3:
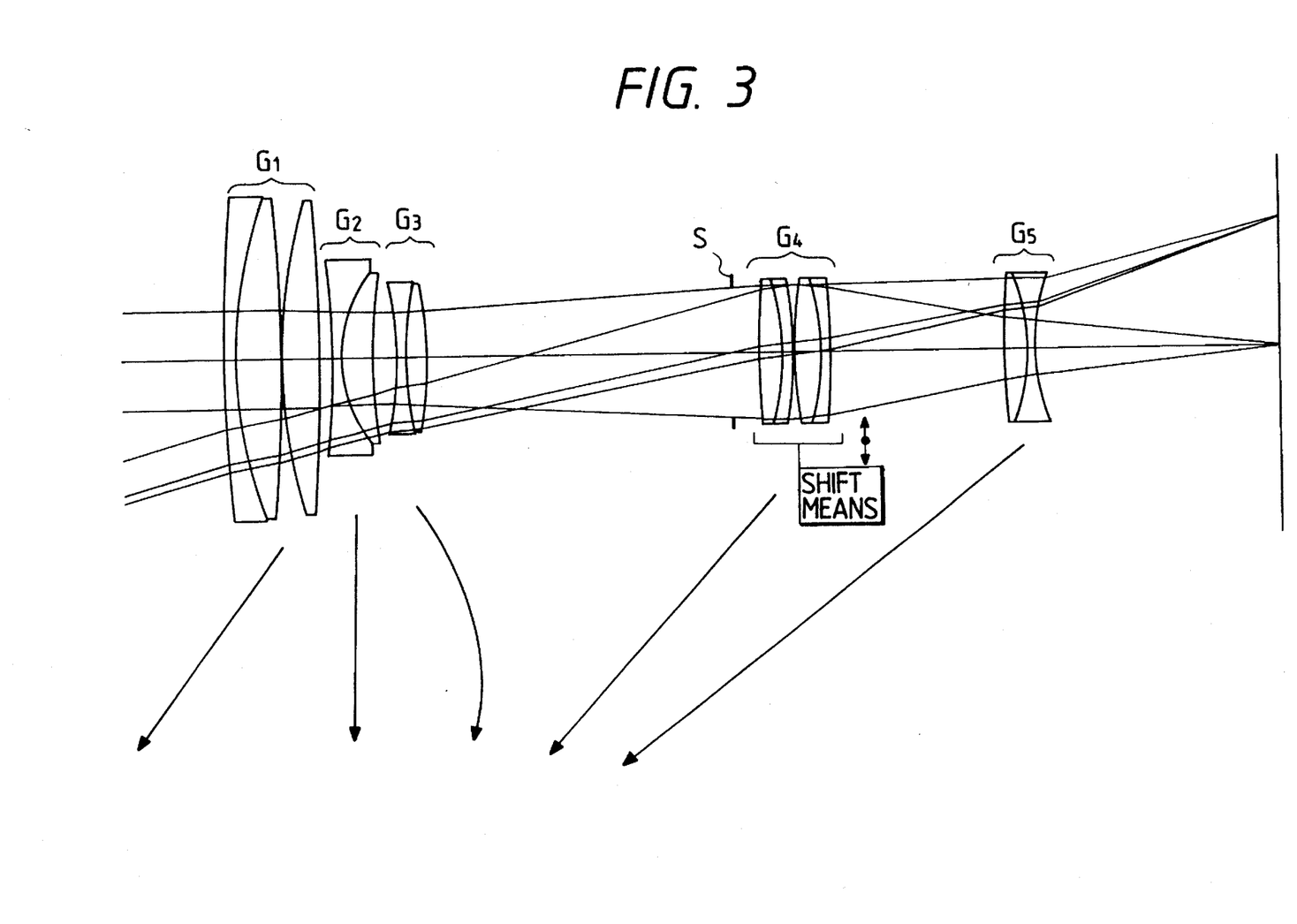
FIG. 3 is a block diagram illustrating a layout of an embodiment 3 of this invention.

FIG. 3 illustrates a layout of lenses in an embodiment 3. The zoom lens is constructed of, sequentially from the object side, a first positive lens group $G_1$ consisting of a cemented lens of a negative meniscus lens with its convex surface toward the object and a biconvex positive lens and of a biconvex positive lens, a second negative lens group $G_2$ consisting of a cemented lens of a negative meniscus lens with its convex surface toward the object and a positive meniscus lens with its convex surface toward the object, a third negative lens group $G_3$ consisting of a cemented lens of a biconcave negative lens and a biconvex positive lens, a stop S, a fourth positive lens group $G_4$ consisting of a cemented lens of a biconvex positive lens and a negative meniscus lens with its concave surface toward the object and a fifth negative lens group $G_5$ consisting of a cemented lens of a biconvex positive lens and a biconcave lens.

Then, the lens groups move so that the spacing between the first and second lens groups $G_1$, $G_2$ increases; the spacing between the second and third lens groups $G_2$, $G_3$ varies non-linearly; and the spacing between the fourth and fifth lens groups $G_4$, $G_5$ is reduced. The fourth lens group $G_4$ is moved in a direction substantially orthogonal (transverse) to the optical axis. The image vibrations are thus prevented.

The following Table 3 shows values of items in the embodiment 3 according to this invention. In Table of the items in accordance with the embodiment, f is the focal length, $F_{No}$ is the F-number and $2\omega$ is the field angle. Then, the numerals at the left end represent the order from the object side, r is the radius of curvature of the lens surface, and d is the lens surface separation. The refractive index n and the Abbe number $\nu$ are values with respect to d-line ($\lambda$=587.6 nm).

[TABLE 3]

Values of the items in the embodiment 3:

f = 76.5–292
$F_{NO}$ = 4.62–5.77
$2\omega$ = 32.6°–8.2°

[TABLE 3]-continued

Values of the items in the embodiment 3:

|   | r | d | ν | n |
|---|---|---|---|---|
| 1 | 280.061 | 2.00 | 40.9 | 1.79631 |
| 2 | 77.586 | 7.30 | 82.6 | 1.49782 |
| 3 | −428.027 | .20 | | |
| 4 | 87.627 | 6.50 | 70.1 | 1.51860 |
| 5 | −427.957 | (d5 = variable) | | |
| 6 | −142.978 | 1.70 | 45.9 | 1.54814 |
| 7 | 22.745 | 5.50 | 36.3 | 1.62004 |
| 8 | 104.648 | (d8 = variable) | | |
| 9 | −52.404 | 1.50 | 47.5 | 1.78797 |
| 10 | 56.961 | 3.60 | 33.8 | 1.64831 |
| 11 | −75.627 | (d11 = variable) | | |
| 12 | 152.933 | 3.80 | 48.1 | 1.71700 |
| 13 | −43.246 | 1.60 | 23.0 | 1.86074 |
| 14 | −83.641 | .50 | | |
| 15 | 71.466 | 4.50 | 57.0 | 1.62280 |
| 16 | −42.561 | 1.60 | 33.9 | 1.80384 |
| 17 | −150.924 | (d17 = variable) | | |
| 18 | 156.427 | 3.70 | 33.9 | 1.80384 |
| 19 | −36.315 | 1.50 | 49.4 | 1.77279 |
| 20 | 33.124 | (d20 = variable) | | |

(Variable separation in variable power)

| f | 76.4987 | 150.0000 | 291.9999 |
|---|---|---|---|
| D0 | ∞ | ∞ | ∞ |
| d5 | 2.0535 | 25.9285 | 61.4300 |
| d8 | 4.1341 | 20.1309 | 20.1276 |
| d11 | 55.3562 | 23.7336 | 9.2402 |
| d17 | 30.1656 | 21.9163 | .9115 |
| d20 | 41.5180 | 65.3932 | 100.8948 |

(Condition corresponding values)

$f_1 = 137.3$, $f_W = 76.5$, $f_T = 292$
$f_4 = 47.503$, $f_5 = -58.888$
$f_{4R} = 102.673$
$D_{W3-4} = 55.3562$
$N_+ = 1.62280$, $N_- = 1.80384$
(1) $f_1/(f_W \cdot f_T)^{1/2} = 0.918646$
(9) $D_{W3-4}/f_W = 0.72361$
(10) $f_4/|f_5| = 0.806667$
(11) $f_{4R}/f_4 = 2.1614$
(12) $(N_+ + N_-)/2 = 1.713320$ (Vibration-proof data)

|   | Wide-angle End | Telephoto End |
|---|---|---|
| Moving Quantity (mm) of 3rd Lens Group in Direction Perpendicular to Optical Axis | 0.11295 | 0.38273 |
| Image Moving Quantity (mm) | 0.25 | 1 |

[Embodiment 4]

Figure 4:
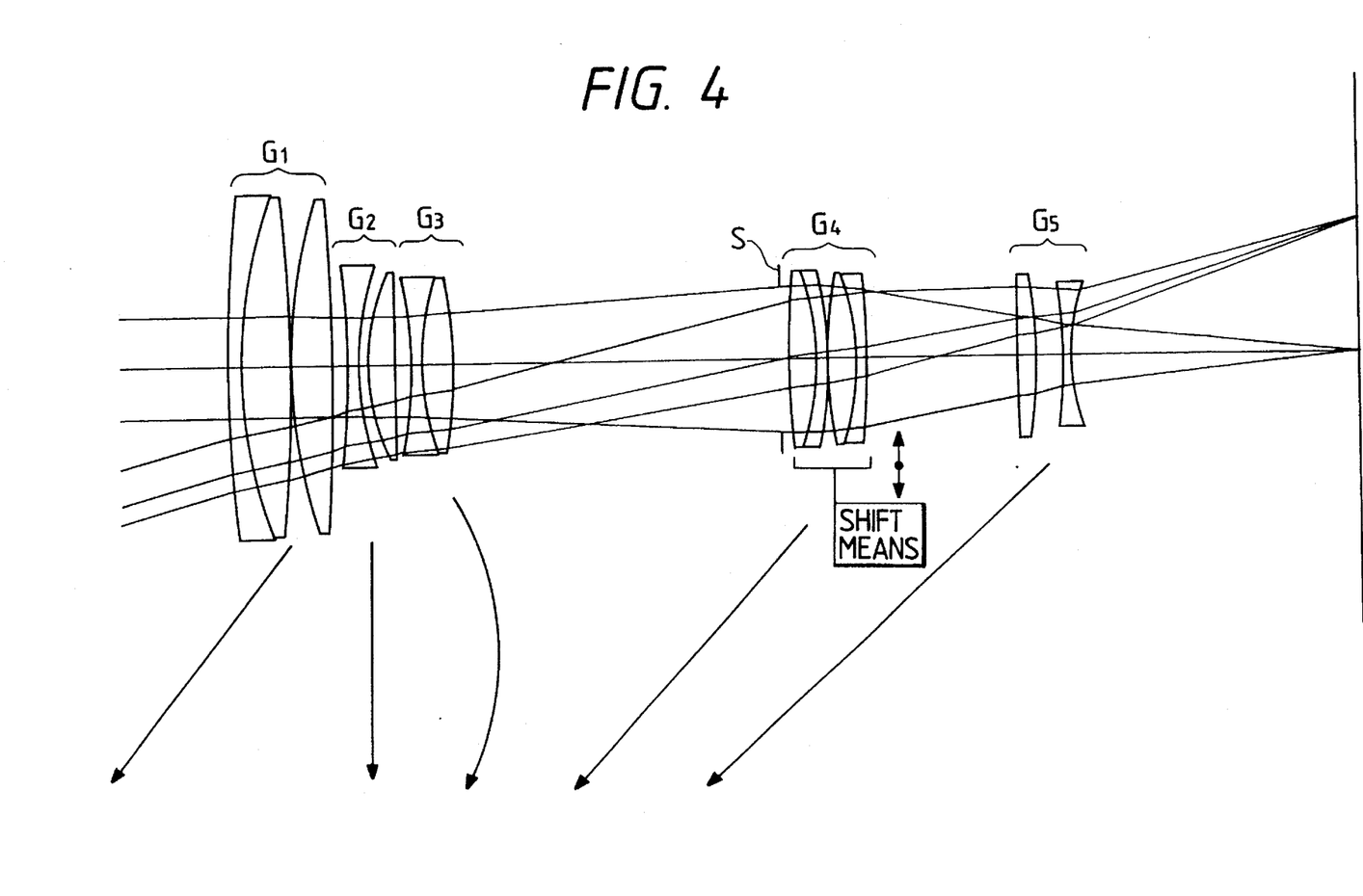
FIG. 4 is a block diagram illustrating a layout of lenses in an embodiment 4 of this invention.

FIG. 4 illustrates a layout of lenses in an embodiment 4. The zoom lens is constructed of, sequentially from the object side, a first positive lens group $G_1$ consisting of a cemented lens of a negative meniscus lens with its convex surface toward the object and a biconvex positive lens and of a biconvex positive lens, a second negative group $G_2$ consisting of a biconcave negative lens and a positive meniscus lens with its convex surface toward the object, a third negative lens group $G_3$ consisting of a cemented lens of a biconcave negative lens and a biconvex positive lens, a stop S, a fourth positive lens group $G_4$ consisting of a cemented lens of a biconvex positive lens and a negative meniscus lens with its concave surface toward the object and of a cemented lens of a biconvex positive lens and a negative meniscus lens with its concave surface toward the object and a fifth negative lens group $G_5$ consisting of a biconvex positive lens and a biconcave negative lens.

Then, when varying the magnifying power from the wide-angle end to the telephoto end, the lens groups move so that the spacing between the first and second lens groups $G_1$, $G_2$ increases; the spacing between the second and third lens groups $G_2$, $G_3$ varies non-linearly; and the spacing between the fourth and fifth lens groups $G_4$, $G_5$ is reduced. The fourth lens group $G_4$ is moved in the direction substantially orthogonal (transverse) to the optical axis. The image vibrations are thus prevented.

The following Table 4 shows values of items in the embodiment 4 according to this invention. In Table of the items in accordance with the embodiment, f is the focal length, FNo is the F-number and 2ω is the field angle. Then, the numerals at the left end represent the order from the object side, r is the radius of curvature of the lens surface, and d is the lens surface separation. The refractive index n and the Abbe number ν are values with respect to d-line (λ=587.6 nm).

[TABLE 4]

Values of the items in the embodiment 4:

f = 76.5–292
$F_{NO}$ = 4.71–5.87
2ω = 32.4°–8.2°

|   | r | d | ν | n |
|---|---|---|---|---|
| 1 | 249.519 | 2.00 | 40.9 | 1.79631 |
| 2 | 76.291 | 7.50 | 82.6 | 1.49782 |
| 3 | −357.836 | .50 | | |
| 4 | 95.779 | 6.00 | 70.1 | 1.51860 |
| 5 | −564.320 | (d5 = variable) | | |
| 6 | −133.390 | 1.70 | 45.1 | 1.74400 |
| 7 | 45.598 | 1.80 | | |
| 8 | 38.299 | 3.80 | 33.8 | 1.64831 |
| 9 | 404.759 | (d9 = variable) | | |
| 10 | −61.368 | 1.50 | 44.7 | 1.80218 |
| 11 | 38.992 | 5.00 | 33.8 | 1.64831 |
| 12 | −82.355 | (d12 = variable) | | |
| 13 | 148.526 | 4.30 | 46.8 | 1.76684 |
| 14 | −44.204 | 1.60 | 23.8 | 1.84666 |
| 15 | −86.959 | .20 | | |
| 16 | 79.739 | 4.50 | 60.3 | 1.62041 |
| 17 | −38.089 | 1.60 | 33.9 | 1.80384 |
| 18 | −150.489 | (d18 = variable) | | |
| 19 | 751.594 | 3.00 | 23.8 | 1.84666 |
| 20 | −88.822 | 4.30 | | |
| 21 | −97.367 | 1.50 | 46.4 | 1.80411 |
| 22 | 36.532 | (d22 = variable) | | |

(Variable separation in variable power)

| f | 76.4992 | 150.0000 | 291.9988 |
|---|---|---|---|
| D0 | ∞ | ∞ | ∞ |
| d5 | 2.4300 | 28.6704 | 60.1162 |
| d9 | 2.9542 | 15.5332 | 13.9733 |
| d12 | 53.6639 | 24.2782 | 1.3195 |
| d18 | 24.7698 | 17.4831 | 1.5011 |
| d22 | 44.8033 | 68.8967 | 109.3968 |

(Condition corresponding values)

$f_1 = 143.0$, $f_W = 76.5$, $f_T = 292$
$f_4 = 47.586$, $f_5 = -55.134$
$f_{4R} = 120.768$
$D_{W3-4} = 53.6639$
$N_+ = 1.62280$, $N_- = 1.80384$
(1) $f_1/(f_W \cdot f_T)^{1/2} = 0.956784$
(9) $D_{W3-4}/f_W = 0.701489$

[TABLE 4]-continued

Values of the items in the embodiment 4:

(10) $f_4/|f_5| = 0.863097$
(11) $f_{4R}/f_4 = 2.537889$
(12) $(N_+ + N_-)/2 = 1.713320$ (Vibration-proof data)

|  | Wide-angle End | Telephoto End |
|---|---|---|
| Moving Quantity (mm) of 4th Lens Group in Direction Perpendicular to Optical Axis | 0.10737 | 0.31141 |
| Image Moving Quantity (Mm) | 0.25 | 1 |

Note that if a sufficient variable power range is taken in the third and fourth embodiments, and when the aberrations are sufficiently corrected, the second lens group may be fixed during zooming.

According to the present invention, it is possible to provide a small-sized zoom lens incorporating the vibration-proofing function and exhibiting a high performance.

It is apparent that, in this invention, a wide range of different working modes can be formed based on the invention without deviating from the spirit and scope of the invention. This invention is not restricted by its specific working modes except being limited by the appended claims.

What is claimed is:

1. A zoom lens incorporating a vibration-proofing function, comprising, sequentially from an object side:

a first lens group having a positive refracting power;

a second lens group having a negative refracting power;

a third lens group having a negative refracting power;

a fourth lens group having a positive refracting power;

a fifth lens group having a negative refracting power, said lens groups moving so that when varying a magnifying power from a wide-angle end to a telephoto end, a spacing between said first and second lens groups increases; a spacing between said second and third lens groups changes linearly or non-linearly; and a spacing between said fourth and fifth lens groups is reduced and a shift means for preventing image vibrations by moving one of said third and fourth lens groups in a direction transverse to the optical axis.

2. The zoom lens as set forth in claim 1, wherein a flare stop fixed on the optical axis is provided.

3. The zoom lens as set forth in claim 1, wherein said fourth lens group consists of, sequentially from the object side, a front group having a positive or negative refracting power and a rear group having a positive refracting power, said rear group is composed of a single lens having the positive refracting power and a single lens having the negative refracting power.

4. A zoom lens incorporating a vibration-proofing function, comprising, sequentially from an object side:

a first lens group having a positive refracting power;

a second lens group having a negative refracting power;

a third lens group having a negative refracting power;

a fourth lens group having a positive refracting power;

a fifth lens group having a negative refracting power, said lens groups moving so that when varying a magnifying power from a wide-angle end to a telephoto end, a spacing between said first and second lens groups increases; a spacing between said second and third lens groups changes linearly or non-linearly; and a spacing between said fourth and fifth lens groups is reduced; and a shift means for preventing image vibrations by moving said third lens group in a direction transverse to the optical axis, said zoom lens satisfying the following conditions:

$$0.3 < f_1/(f_W \cdot f_T)^{1/2} < 1.5 \quad (1)$$

$$0.3 < f_2/f_3 < 5 \quad (2)$$

$$0.8 < |f_3|/f_W < 2 \quad (3)$$

where $f_1$ is the focal length of said first lens group, $f_2$ is the focal length of said second lens group, $f_3$ is the focal length of said third lens group, $f_W$ is the focal length of a whole system at the wide-angle end, and $f_T$ is the focal length of the whole system at the telephoto end.

5. The zoom lens as set forth in claim 4, wherein said zoom lens further satisfies the following condition:

$$0.6 < (f_W \cdot f_T)^{1/2} < 1.5.$$

6. The zoom lens as set forth in claim 5, wherein said zoom lens satisfies the following condition:

$$0.25 < D_{W3-4}/F_W < 0.65 \quad (4)$$

Where $D_{W3-4}$ is the spacing between said third and fourth lens groups at the wide-angle end.

7. The zoom lens as set forth in claim 6, wherein said zoom lens satisfies the following condition:

$$-20 < \beta_{T3}/\beta_{W3} < 10 \quad (5)$$

where $\beta_{W3}$ is the using magnification of said third lens group at the wide-angle end, and $\beta_{T3}$ is the using magnification of said third lens group at the telephoto end.

8. The zoom lens as set forth in claim 7, wherein said zoom lens satisfies the following condition:

$$\bar{n} > 1.6 \quad (6)$$

$$\bar{v} > 40 \quad (7)$$

where $\bar{n}$ designates mean refractive index of the lenses constituting said third lens group, and $\bar{v}$ designates mean Abbe number with respect to the mean d-line of the lenses constituting said third lens group, and the mean refractive index $\bar{n}$ of said third lens group is obtained by the following formula:

$$\bar{n} = (\psi_1 n_1 + \psi_2 n_2 + \ldots + \psi_L \cdot n_L) / (\psi_1 + \psi_2 + \ldots + \psi_L)$$

where $n_1, \ldots n_L$ are refractive indices of the lens elements constituting said third lens group, and $\psi_1, \ldots \psi_L$ are refracting powers (=inverse number of focal length).

9. The zoom lens as set forth in claim 8, wherein said zoom lens satisfies the following condition:

$$R_{31} > -200 \quad (8)$$

where $R_{31}$ is the radius of curvature of the closest-to-the-object surface of said third lens group.

10. The zoom lens as set forth in claim 4, wherein a flare stop fixed on the optical axis is provided.

11. The zoom lens as set forth in claim 4, wherein said zoom lens is constructed based on the following data:

$f = 82–196$
$F_{NO} = 4.6–5.7$
$2\omega = 29.66–12.16°$

|   | r | d | ν | n |
|---|---|---|---|---|
| 1 | 53.631 | 2.20 | 23.0 | 1.86074 |
| 2 | 39.941 | .50 | | |
| 3 | 42.000 | 6.00 | 69.9 | 1.51860 |
| 4 | −253.597 | (d4 = variable) | | |
| 5 | −46.982 | 1.50 | 47.1 | 1.67003 |
| 6 | 37.449 | 3.00 | 27.6 | 1.75520 |
| 7 | −154.003 | (d7 = variable) | | |
| 8 | −250.166 | 2.00 | 47.5 | 1.78797 |
| 9 | 78.415 | (d9 = variable) | | |
| 10 | 152.812 | 3.00 | 46.4 | 1.58267 |
| 11 | −37.057 | .20 | | |
| 12 | 50.036 | 4.50 | 60.7 | 1.56384 |
| 13 | −31.136 | 1.70 | 25.5 | 1.80458 |
| 14 | −354.680 | (d14 = variable) | | |
| 15 | −488.183 | 3.00 | 26.1 | 1.78470 |
| 16 | −46.681 | 2.07 | | |
| 17 | −50.713 | 1.50 | 53.7 | 1.69350 |
| 18 | 35.916 | (d18 = variable) | | |

(Variable separation in variable power)

| f | 82.0000 | 135.0000 | 196.0000 |
|---|---|---|---|
| D0 | ∞ | ∞ | ∞ |
| d4 | 2.1562 | 23.7506 | 39.4991 |
| d7 | 4.1898 | 2.7190 | 8.8577 |
| d9 | 24.9438 | 14.6750 | 2.8315 |
| d14 | 22.0952 | 12.2404 | 2.1968 |
| d18 | 43.0664 | 64.6608 | 80.4093 |

(Condition corresponding values)

$f_1 = 111.021$, $f_W = 82$, $f_T = 196$
$f_2 = -145.113$
$f_3 = -75.564$
$D_{W3-4} = 24.9438$
$\beta_{W3} = -0.2444$, $\beta_{T3} = -1.8630$
$R_{31} = -250.166$
(1) $f_1/(f_W \cdot f_T)^{1/2} = 0.87573$
(2) $f_2/f_3 = 1.92034$
(3) $|f_3|/f_W = 0.9215$
(4) $D_{W3-4}/f_W = 0.304193$
(5) $\beta_{T3}/\beta_{W3} = 7.623$
(6) $n = 1.78797$
(7) $\nu = 47.5$
(8) $R_{31} = -250.166$ (Vibration-proof data)

|   | Wide-angle End | Telephoto End |
|---|---|---|
| Moving Quantity (mm) of 3rd Lens Group in Direction Perpendicular to Optical Axis | 0.198 | 0.350 |
| Image Moving Quantity (mm) | 0.2 | 0.5 | where in the Table of the items, f is the focal length, $F_{No}$ is the F-number and $2\omega$ is the field angle, the numerals at the left end represent the order from the object side, r is the radius of curvature of the lens surface, d is the lens surface separation, and the refractive index n and the Abbe number ν are values with respect to d-line ($\lambda = 587.6$ nm); and where $D_{W3-4}$ disignates spacing between said third and fourth lens groups at the wide-angle end, $\beta_{W3}$ designates using magnification of said third lens group at the wide-angle end, $\beta_{T3}$ designates using magnification of said third lens group at the telephoto end, $\bar{n}$ mean refractive index of the lenses constituting said third lens group, and $\bar{\nu}$ designates mean Abbe number with respect to the mean d-line of the lenses constituting said third lens group, and the means refractive index $\bar{n}$ of said third lens group is obtained by the following formula:

$$\bar{n} = (\psi_1 N_1 + \psi_2 N_2 + \ldots + \psi_L \cdot n_L) / (\psi_1 + \psi_2 + \ldots + \psi_L)$$

where $n_1, \ldots n_L$ are refractive indices of the lens elements constituting said third lens group, and $\psi_1, \ldots \psi_L$ are refracting powers (=inverse number of focal length).

12. The zoom lens as set forth in claim 4, wherein said zoom lens is constructed based on the following data:

$f = 82–196$
$F_{NO} = 4.62–5.7$
$2\omega = 29.24–12.08°$

|   | r | d | ν | n |
|---|---|---|---|---|
| 1 | 53.993 | 2.20 | 25.5 | 1.80458 |
| 2 | 37.137 | .50 | | |
| 3 | 37.749 | 7.00 | 64.1 | 1.51680 |
| 4 | −228.729 | (d4 = variable) | | |
| 5 | −42.349 | 1.50 | 42.0 | 1.66755 |
| 6 | 32.372 | 3.00 | 27.6 | 1.75520 |
| 7 | −105.299 | (d7 = variable) | | |
| 8 | −300.511 | 2.00 | 47.5 | 1.78797 |
| 9 | 68.734 | (d9 = variable) | | |
| 10 | 474.746 | 3.00 | 46.4 | 1.58267 |
| 11 | −35.274 | .50 | | |
| 12 | 45.251 | 4.50 | 60.7 | 1.56384 |
| 13 | −32.297 | 1.70 | 25.5 | 1.80458 |
| 14 | −242.346 | (d14 = variable) | | |
| 15 | ∞ | 4.00 | 26.1 | 1.78470 |
| 16 | −24.282 | 1.50 | 38.8 | 1.67163 |
| 17 | 28.801 | (d17 = variable) | | |

(Variable separation in variable power)

| f | 82.0000 | 135.0000 | 196.0000 |
|---|---|---|---|
| D0 | ∞ | ∞ | ∞ |
| d4 | 2.8064 | 24.7099 | 39.9550 |
| d7 | 2.9810 | .5461 | 7.4257 |
| d9 | 24.5298 | 14.9373 | 2.7893 |
| d14 | 23.3891 | 13.5130 | 3.5363 |
| d17 | 40.6047 | 62.50817 | 77.7533 |

(Condition corresponding values)

$f_1 = 107.913$, $f_W = 82$, $f_T = 196$
$f_2 = -179.085$
$f_3 = -70.823$
$D_{W3-4} = 24.5298$
$\beta_{W3} = -0.4285$, $\beta_{T3} = -3.4888$
$R_{31} = -300.511$
(1) $f_1/(f_W \cdot f_T)^{1/2} = 0.85121$
(2) $f_2/f_3 = 2.52863$
(3) $|f_3|/f_W = 0.8637$
(4) $D_{W3-4}/f_W = 0.299144$
(5) $\beta_{T3}/\beta_{W3} = 8.1419$
(6) $n = 1.78797$
(7) $\nu = 47.5$
(8) $R_{31} = -300.511$ (Vibration-proof data)

|   | Wide-angle End | Telephoto End |
|---|---|---|
| Moving Quantity (mm) of 3rd Lens Group in Direction Perpendicular to Optical Axis | 0.188 | 0.341 |

-continued

| Image Moving Quantity (Mm) | 0.2 | 0.5 | where in the Table of the items, f is the focal length, $F_{No}$ is the F-number and $2\omega$ is the field angle, the numerals at the left end represent the order from the object side, r is the radius of curvature of the lens surface, d is the lens surface separation, and the refractive index n and the Abbe number $\nu$ are values with respect to d-line ($\lambda$=587.6 nm); and where $D_{W3-4}$ designates spacing between said third and fourth lens groups at the wide-angle end, $\beta_{W3}$ designates using magnification of said third lens group at the wide-angle end, $\beta_{T3}$ designates using magnification of said third lens group at the telephoto end, $\bar{n}$ designates mean refractive index of the lenses constituting said third lens group $G_3$, and $\bar{\nu}$ designates mean Abbe number with respect to the mean d-line of the lenses constituting said third lens group, and the means refractive index $\bar{n}$ of said third lens group is obtained by the following formula:

$$\bar{n}=(\psi_1 n_1+\psi_2 n_2+\ldots+\psi_L \cdot n_L) / (\psi_1+\psi_2+\ldots+\psi_L)$$

where $n_1, \ldots n_L$ are refractive indices of the lens elements constituting said third lens group, and $\psi_1, \ldots \psi_L$ are refracting powers (=inverse number of focal length).

13. A zoom lens incorporating a vibration-proofing function, comprising, sequentially from an object side:

a first lens group having a positive refracting power;

a second lens group having a negative refracting power;

a third lens group having a negative refracting power;

a fourth lens group having a positive refracting power;

a fifth lens group having a negative refracting power, said lens groups moving so that when varying a magnifying power from a wide-angle end to a telephoto end, a spacing between said first and second lens groups increases; a spacing between said second and third lens groups changes linearly or non-linearly; and a spacing between said fourth and fifth lens groups is reduced; and a shift means for preventing image vibrations by moving said fourth lens group in a direction transverse to the optical axis, said zoom lens satisfying the following conditions:

$$0.3 < f_1/(f_W f_T)^{1/2} < 1.5 \quad (1)$$

$$0.25 < D_{W3-4}/f_W < 0.8 \quad (9)$$

$$0.6 < f_4/|f_5| < 1.2 \quad (10)$$

where $f_1$ is the focal length of said first lens group, $f_4$ is the focal length of said fourth lens group, $f_5$ is the focal length of said fifth lens group, $f_W$ is the focal length of a whole system at the wide-angle end, $f_T$ is the focal length of the whole system at the telephoto end, and $D_{W3-4}$ is the spacing between said third and fourth lens groups at the wide-angle end.

14. The zoom lens as set forth in claim 13, wherein a flare stop fixed on the optical axis is provided.

15. The zoom lens as set forth in claim 13, wherein said fourth lens group consists of, sequentially from the object side, a front group having a positive or negative refracting power and a rear group having a positive refracting power, said rear group is composed of a single lens having the positive refracting power and a single lens having the negative refracting power.

16. The zoom lens as set forth in claim 15, wherein said rear group consists of, sequentially from the object side, a positive single lens and a negative single lens.

17. The zoom lens as set forth in claim 16, wherein said zoom lens satisfies the following condition:

$$0.5 < f_4/f_4 < 2.5 \quad (11)$$

where $f_4$ designates focal length of said fourth lens group, and $f_{4R}$ designates focal length of said rear group.

18. The zoom lens as set forth in claim 17, wherein said zoom lens satisfies the following condition:

$$(N_+ + N_-)/2 > 1.7 \quad (12)$$

where $N_+$ designates refractive index of said positive single lens, and $N_-$ designates refractive index of said negative single lens constituting said rear group.

19. The zoom lens as set forth in claim 13, wherein said zoom lens is constructed based on the following data:

| | f = 76.5–292 $F_{NO}$ = 4.62–5.77 $2\omega$ = 32.6°–8.2° | | | |
|---|---|---|---|---|
| | r | d | v | n |
| 1 | 280.061 | 2.00 | 40.9 | 1.79631 |
| 2 | 77.586 | 7.30 | 82.6 | 1.49782 |
| 3 | −428.027 | .20 | | |
| 4 | 87.627 | 6.50 | 70.1 | 1.51860 |
| 5 | −427.957 | (d5 = variable) | | |
| 6 | −142.978 | 1.70 | 45.9 | 1.54814 |
| 7 | 22.745 | 5.50 | 36.3 | 1.62004 |
| 8 | 104.648 | (d8 = variable) | | |
| 9 | −52.404 | 1.50 | 47.5 | 1.78797 |
| 10 | 56.961 | 3.60 | 33.8 | 1.64831 |
| 11 | −75.627 | (d11 = variable) | | |
| 12 | 152.933 | 3.80 | 48.1 | 1.71700 |
| 13 | −43.246 | 1.60 | 23.0 | 1.86074 |
| 14 | −83.641 | .50 | | |
| 15 | 71.466 | 4.50 | 57.0 | 1.62280 |
| 16 | −42.561 | 1.60 | 33.9 | 1.80384 |
| 17 | −150.924 | (d17 = variable) | | |
| 18 | 156.427 | 3.70 | 33.9 | 1.80384 |
| 19 | −36.315 | 1.50 | 49.4 | 1.77279 |
| 20 | 33.124 | (d20 = variable) | | |

| (Variable separation in variable power) | | | |
|---|---|---|---|
| f | 76.4987 | 150.0000 | 291.9999 |
| D0 | ∞ | ∞ | ∞ |
| d5 | 2.0535 | 25.9285 | 61.4300 |
| d8 | 4.1341 | 20.1309 | 20.1276 |
| d11 | 55.3562 | 23.7336 | 9.2402 |
| d17 | 30.1656 | 21.9163 | .9115 |
| d20 | 41.5180 | 65.3932 | 100.8948 |

| (Condition corresponding values) |
|---|
| $f_1$ = 137.3, $f_W$ = 76,5, $f_T$ = 292 |
| $f_4$ = 47.503, $f_5$ = −58.888 |
| $f_{4R}$ = 102.673 |
| $D_{W3-4}$ = 55.3562 |
| $N_+$ = 1.62280, $N_-$ = 1.80384 |
| (1) $f_1/(f_W \cdot f_T)^{1/2}$ = 0.918646 |
| (9) $D_{W3-4}/f_W$ = 0.72361 |
| (10) $f_4/|f_5|$ = 0.806667 |
| (11) $f_{4R}/f_4$ = 2.1614 |

|  |  |
|---|---|
| (12) $(N_+ + N_-)/2 = 1.713320$ | |

| (Vibration-proof data) | | |
|---|---|---|
| | Wide-angle End | Telephoto End |
| Moving Quantity (mm) of 3rd Lens Group in Direction Perpendicular to Optical Axis | 0.11295 | 0.38273 |
| Image Moving Quantity (mm) | 0.25 | 1 | where in the Table of the items, f is the focal length, $F_{No}$ is the F-number and $2\omega$ is the field angle, the numerals at the left end represent the order from the object side, r is the radius of curvature of the lens surface, d is the lens surface separation, and the refractive index n and the Abbe number $\nu$ are values with respect to d-line ($\lambda$=587.6 nm); and where $f_4$ designates focal length of said fourth lens group, and $f_{4R}$ designates focal length of said rear group, $N_+$ designates refractive index of said positive single lens, and $N_-$ designates refractive index of said negative single lens constituting said rear group.

20. The zoom lens as set forth in claim 13, wherein said zoom lens is constructed based on the following data:

$$f = 76.5-292$$
$$F_{NO} = 4.71-5.87$$
$$2\omega = 32.4°-8.2°$$

| | r | d | $\nu$ | n |
|---|---|---|---|---|
| 1 | 249.519 | 2.00 | 40.9 | 1.79631 |
| 2 | 76.291 | 7.50 | 82.6 | 1.49782 |
| 3 | −357.836 | .50 | | |
| 4 | 95.779 | 6.00 | 70.1 | 1.51860 |
| 5 | −564.320 | (d5 = variable) | | |
| 6 | −133.390 | 1.70 | 45.1 | 1.74400 |
| 7 | 45.598 | 1.80 | | |
| 8 | 38.299 | 3.80 | 33.8 | 1.64831 |
| 9 | 404.759 | (d9 = variable) | | |
| 10 | −61.368 | 1.50 | 44.7 | 1.80218 |
| 11 | 38.992 | 5.00 | 33.8 | 1.64831 |
| 12 | −82.355 | (d12 = variable) | | |
| 13 | 148.526 | 4.30 | 46.8 | 1.76684 |
| 14 | −44.204 | 1.60 | 23.8 | 1.84666 |
| 15 | −86.959 | .20 | | |
| 16 | 79.739 | 4.50 | 60.3 | 1.62041 |
| 17 | −38.089 | 1.60 | 33.9 | 1.80384 |
| 18 | −150.489 | (d18 = variable) | | |
| 19 | 751.594 | 3.00 | 23.8 | 1.84666 |
| 20 | −88.822 | 4.30 | | |
| 21 | −97.367 | 1.50 | 46.4 | 1.80411 |
| 22 | 36.532 | (d22 = variable) | | |

| (Variable separation in variable power) | | | |
|---|---|---|---|
| f | 76.4992 | 150.0000 | 291.9988 |
| D0 | ∞ | ∞ | ∞ |
| d5 | 2.4300 | 28.6704 | 60.1162 |
| d9 | 2.9542 | 15.5332 | 13.9733 |
| d12 | 53.6639 | 24.2782 | 1.3195 |
| d18 | 24.7698 | 17.4831 | 1.5011 |
| d22 | 44.8033 | 68.8967 | 109.3968 |

| (Condition corresponding values) |
|---|
| $f_1 = 143.0$, $f_W = 76.5$, $f_T = 292$ |
| $f_4 = 47.586$, $f_5 = -55.134$ |
| $f_{4R} = 120.768$ |
| $D_{W3-4} = 53.6639$ |
| $N_+ = 1.62280$, $N_- = 1.80384$ |
| (1) $f_1/(f_W \cdot f_T)^{1/2} = 0.956784$ |
| (9) $D_{W3-4}/f_W = 0.701489$ |
| (10) $f_4/|f_5| = 0.863097$ |
| (11) $f_{4R}/f_4 = 2.537889$ |
| (12) $(N_+ + N_-)/2 = 1.713320$ |

| (Vibration-proof data) | | |
|---|---|---|
| | Wide-angle End | Telephoto End |
| Moving Quantity (mm) of 4th Lens Group in Direction Perpendicular to Optical Axis | 0.10737 | 0.31141 |
| Image Moving Quantity (Mm) | 0.25 | 1 | where in the Table of the items, f is the focal length, $F_{No}$ is the F-number and $2\omega$ is the field angle, the numerals at the left end represent the order from the object side, r is the radius of curvature of the lens surface, d is the lens surface separation, and the refractive index n and the Abbe number $\nu$ are values with respect to d-line ($\lambda$=587.6 nm); and where $f_4$ designates focal length of said fourth lens group, and $f_{4R}$ designates focal length of said rear group, $N_+$ designates refractive index of said positive single lens, and $N_-$ designates refractive index of said negative single lens constituting said rear group.

\* \* \* \* \*